United States Patent
Hwang et al.

(10) Patent No.: US 9,687,065 B2
(45) Date of Patent: Jun. 27, 2017

(54) SUPPORT FRAME

(71) Applicant: Sun Ho Hwang, Jeju-si (KR)

(72) Inventors: Sun Ho Hwang, Jeju-si (KR); Kung Ho Cho, Jeju-si (KR)

( * ) Notice: Subject to any disclaimer, the term of this patent is extended or adjusted under 35 U.S.C. 154(b) by 0 days.

(21) Appl. No.: 14/908,486

(22) PCT Filed: Nov. 6, 2013

(86) PCT No.: PCT/KR2013/010029
§ 371 (c)(1),
(2) Date: Jan. 28, 2016

(87) PCT Pub. No.: WO2015/030300
PCT Pub. Date: Mar. 5, 2015

(65) Prior Publication Data
US 2016/0166049 A1     Jun. 16, 2016

(30) Foreign Application Priority Data
Aug. 28, 2013    (KR) .................. 10-2013-0102758

(51) Int. Cl.
| | | |
|---|---|---|
| F16M 11/04 | (2006.01) | |
| F16M 11/16 | (2006.01) | |
| F16M 11/32 | (2006.01) | |
| A45F 3/44 | (2006.01) | |
| F16M 11/24 | (2006.01) | |

(52) U.S. Cl.
CPC ............. *A45F 3/44* (2013.01); *F16M 11/04* (2013.01); *F16M 11/16* (2013.01); *F16M 11/242* (2013.01); *F16M 11/32* (2013.01)

(58) Field of Classification Search
CPC ...... A45F 3/44; F16M 11/242; F16M 11/245; F16M 11/16; F16M 11/02; F16M 11/04; F16M 11/32
USPC ...... 248/163.1, 166, 168, 169, 176.1, 188.5, 248/156, 530
See application file for complete search history.

(56) References Cited

U.S. PATENT DOCUMENTS

| | | | | |
|---|---|---|---|---|
| 821,052 | A * | 5/1906 | McLeod | F16M 11/16 16/365 |
| 957,419 | A * | 5/1910 | Gurley | F16M 11/16 182/3 |
| 1,646,064 | A * | 10/1927 | Obermeyer, Jr. | A47G 29/1216 248/146 |
| 2,166,258 | A * | 7/1939 | Matrat | F16M 11/04 248/187.1 |
| 2,229,473 | A * | 1/1941 | Redmer | F16M 11/16 16/331 |
| 2,467,567 | A * | 4/1949 | Price | F16M 11/04 248/169 |
| 2,630,289 | A * | 3/1953 | Selig | G10G 5/00 248/169 |

(Continued)

FOREIGN PATENT DOCUMENTS

| | | |
|---|---|---|
| KR | 10-2008-0048061 A | 5/2000 |
| KR | 10-0522459 B1 | 10/2005 |

*Primary Examiner* — Muhammad Ijaz
(74) *Attorney, Agent, or Firm* — East West Law Group; Heedong Chae (57) ABSTRACT

According to the support frame of the present invention, a user can simultaneously fix legs at different angles by moving up a fixing member by an operation of the user, so the support frame can be stably installed on an uneven ground.

6 Claims, 7 Drawing Sheets

(56) References Cited

U.S. PATENT DOCUMENTS

| | | | | |
|---|---|---|---|---|
| 3,881,675 | A * | 5/1975 | Matchett | F16M 11/16 248/170 |
| 3,921,947 | A * | 11/1975 | Adam | F16M 11/14 248/168 |
| 4,317,552 | A * | 3/1982 | Weidler | F16M 11/16 211/203 |
| 4,438,896 | A * | 3/1984 | Hall | F16M 11/046 248/168 |
| 5,025,715 | A * | 6/1991 | Sir | A47J 33/00 126/30 |
| 5,267,712 | A | 12/1993 | Shen | |
| 5,614,918 | A * | 3/1997 | Dinardo | F16M 11/14 248/181.1 |
| 5,749,549 | A * | 5/1998 | Ashjaee | F16M 11/14 248/168 |
| 5,769,370 | A * | 6/1998 | Ashjaee | F16M 11/14 248/168 |
| 5,823,491 | A * | 10/1998 | Lindsay | F16M 11/16 248/169 |
| 6,068,224 | A * | 5/2000 | Horiuchi | F16M 11/16 248/168 |
| 6,604,844 | B2 * | 8/2003 | Hussey | E04H 15/28 135/147 |
| D607,037 | S * | 12/2009 | Lee | D16/244 |
| 7,669,813 | B2 * | 3/2010 | Crain | G01C 15/06 248/163.1 |
| 8,047,481 | B2 * | 11/2011 | Shen | F16M 11/16 248/170 |
| 2004/0004168 | A1 * | 1/2004 | Crain | F16B 7/1463 248/188.8 |
| 2005/0056739 | A1 * | 3/2005 | Koning | F16M 11/046 248/171 |
| 2005/0121590 | A1 * | 6/2005 | Vanover | F16M 11/16 248/519 |
| 2006/0086869 | A1 * | 4/2006 | Hsieh | F16M 11/046 248/171 |
| 2008/0290243 | A1 * | 11/2008 | Bonnema | A01K 39/012 248/533 |
| 2011/0073722 | A1 * | 3/2011 | Meuret | F16M 11/34 248/169 |
| 2014/0151527 | A1 * | 6/2014 | Sawhney | F16M 11/242 248/542 |
| 2016/0061377 | A1 * | 3/2016 | Nakatani | F16M 11/242 248/184.1 |
| 2016/0166049 | A1 * | 6/2016 | Hwang | A45F 3/44 248/156 |

* cited by examiner

SUPPORT FRAME

CROSS-REFERENCE TO RELATED APPLICATION

This application claims the benefit of Korean Application No. 10-2013-0102758, filed on Aug. 28, 2013 with the Korean Intellectual Property Office, the disclosure of which is incorporated herein by reference.

BACKGROUND OF THE INVENTION

1. Field of the Invention

The present invention relates to a support frame and, more particularly, to a support frame that is stably installed on a ground where it is difficult to maintain balance such as an uneven ground or a slope.

2. Description of the Related Art

For example, according to the support frames for beach umbrellas that are used at present, weight is ensured at the lower end by cement or a casting (cast iron), a support of the beach umbrella is coupled to the center to support the support frame, a support side is stuck in the ground, and the support of the beach umbrella is placed thereon.

The existing support frames should be used for their use environments and functions and users have to purchase those support frames having different functions. Further, a weight type of support frame is difficult to carry and support frames that are designed to be stuck in a support floor can be used only on the ground and the like, where support pins can be stuck.

That is, the existing support frames are designed to support beach umbrellas that are supported at the center, so they are not enough for supporting a beach umbrella or an object of which the center of gravity is inclined.

Further, legs of the present invention can be moved and fixed at 180 degrees in a tripod shape to be available for a support frame having a tripod-shaped support such as the tripod for a camera.

Accordingly, the present invention provides a support frame that can support an object regardless of the ground such as a flat ground, an uneven ground, a slope, asphalt, or cement and that can support a beach umbrella of which the center of gravity is inclined, a support frame that is stuck in the ground, and an object supported in a tripod-shaped support such as the tripod for a camera.

PRIOR ART DOCUMENT 1

[Patent Document] Korean Patent Publication No. 10-1989-0012188

SUMMARY OF THE INVENTION

An object of the present invention is to provide a support frame that is stably installed on a ground where it is difficult to maintain balance such as an uneven ground or a slope.

According to an aspect of the present invention, a support frame include: a housing having a rotational groove; a plurality of legs having an upper end inserted in the rotational groove of the housing to turn up and down and a lower end supported on the ground and a fixing module disposed on the housing to be moved by an operating force of a user and simultaneously fixing the legs simultaneously in close contact with the upper ends of the plurality of legs.

The fixing module may include a fixing member that is turned or moved up and down by an operating force of a user and simultaneously fixes the plurality of legs.

The legs may have a rotary portion inserted in the rotational groove, hinge-coupled to the housing, and fixed by interference with the fixing module, and a leg portion connected to the rotary portion to be supported on the around.

The fixing module may include: an operation member disposed on the housing and turned by an operating force of a user; and a fixing member disposed in the housing, interfering with the operation member, and simultaneously interfering with the plurality of legs by changing turn of the operation member in the up-down direction.

The operation member may have: an interference groove where the fixing member is inserted; and an interference portion generating interference with the fixing member, on the inner side of the interference groove.

The fixing member may have: a fixing body disposed in the housing; an interference tooth portion that is formed on the fixing body and generates interference by being coupled to the interference portion; a fixing tooth portion that is formed on the outer side of the fixing body and simultaneously generates interference with the plurality of legs; and a fixing guide that is formed on the fixing body and moves along the housing.

The housing may have a housing guide that generates interference wish turn of the fixing member and guides the fixing member moving up and down.

The support frame may further include a fixing pin fixed to the housing to be stuck into the ground.

The operation member may be formed in a lever shape, may be connected to the fixing member through a lever shaft, and may move the fixing member up and down on the housing when being turned.

The fixing member and the legs may generate interference by friction or engagement.

According to the support frame of the present invention, a user can simultaneously fix legs at different angles by moving up a fixing member by an operation of the user, so the support frame can be stably installed on an uneven ground.

Further, according to the present invention, it is possible to move up or down the fixing member by changing a rotational force from a user in the up-down direction, so if is possible to simultaneously fix a plurality of legs.

DETAILED DESCRIPTION OF THE PREFERRED EMBODIMENTS

Hereinafter, the present invention will be described in detail with reference to the accompanying drawings.

In describing the present invention, well-known functions or constructions will not be described in detail since they may unnecessarily obscure the understanding of the present invention. It should be noted that even if the same terms are used but they indicate different components, they are not given the same reference numerals.

The terms described hereafter are terms defined in consideration of the functions in the present disclosure and may be change in accordance with the intention of a user such as an experimenter and a measurer and a custom, so the definition should be based on the entire description of the present disclosure.

Terms used in the specification, 'first', 'second', and the like, may be used to describe various components, but the components are not to be construed as being limited to the terms. The terms are used to distinguish one component from another component. For example, the 'first' component may be named the 'second' component, and vice versa, without departing from the scope of the present invention. The term 'and/or' includes a combination of a plurality of items or any one of a plurality of terms.

Terms used in the present specification are used only in order to describe specific exemplary embodiments rather than limiting the present invention. As used herein, the singular forms are intended to include the plural forms as well, unless the context clearly indicates otherwise.

Unless otherwise defined, all terms including technical and scientific terms used herein have the same meaning as commonly understood by one of ordinary skill in the art to which the present invention belongs. It must be understood that the terms defined by the dictionary are identical with the meanings within the context of the related art, and they should not be ideally or excessively formally defined unless the context clearly dictates otherwise.

Further, unless explicitly described otherwise, "comprising" any components will be understood to imply the inclusion of other components rather than the exclusion of any other components.

Figure 1:
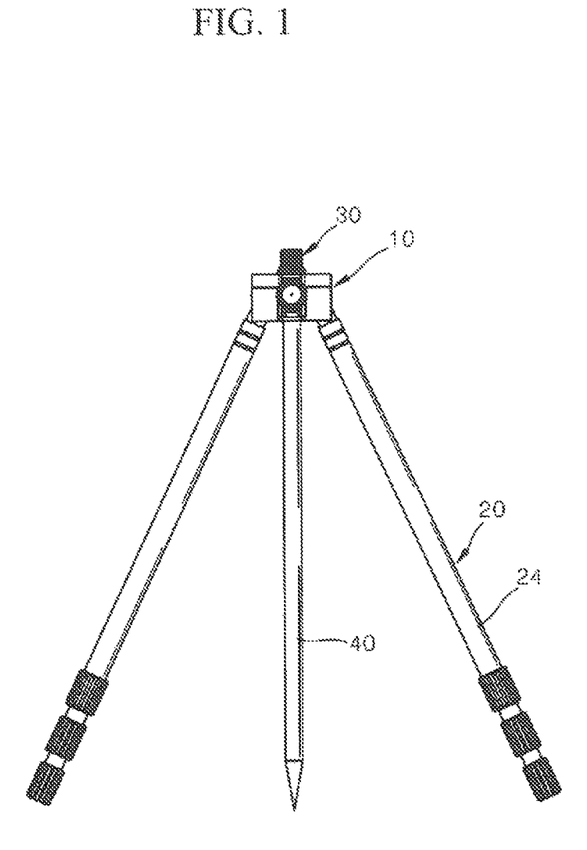
FIG. 1 is a perspective view of a first embodiment of the present invention.
Figure 2:
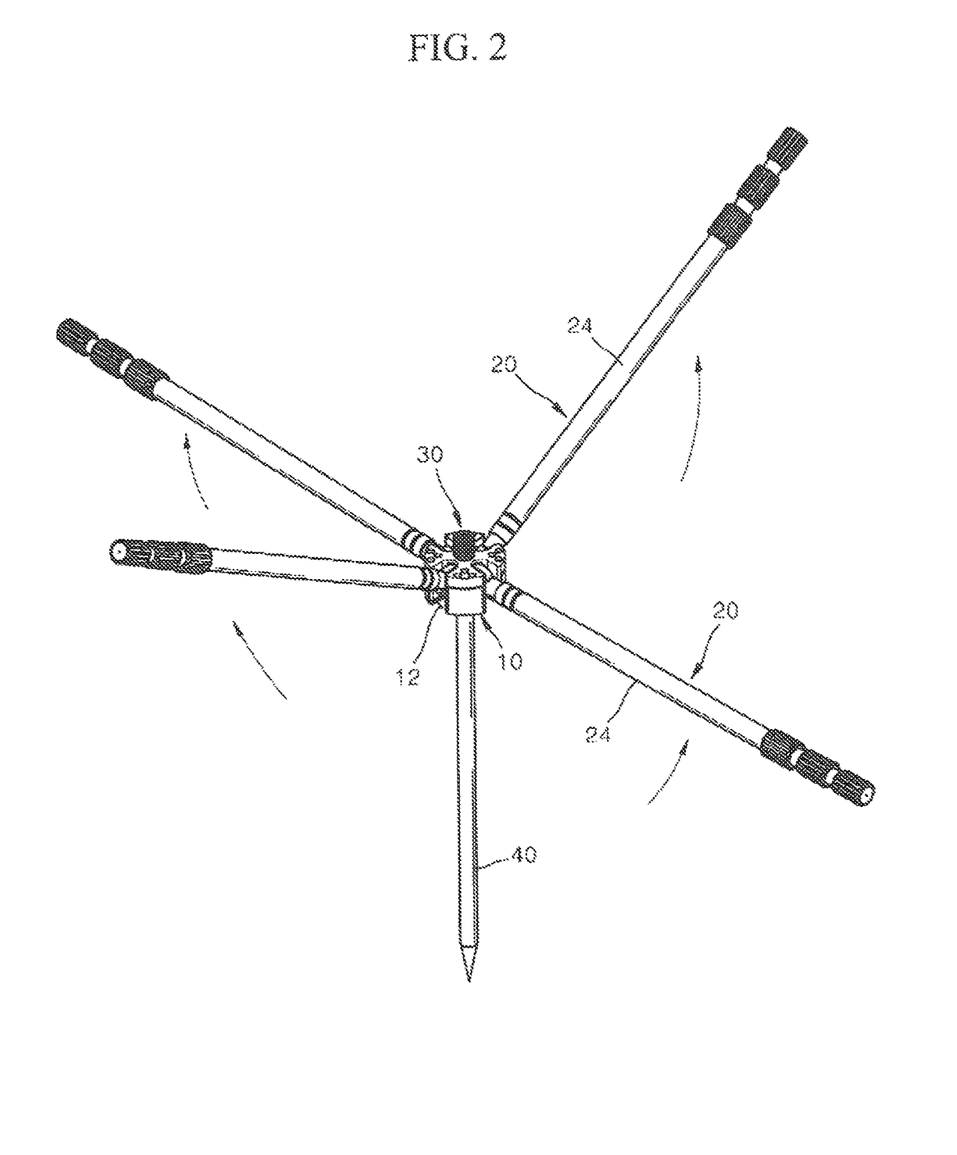
FIG. 2 is a first exemplary view illustrating operation of FIG. 1.
Figure 3:
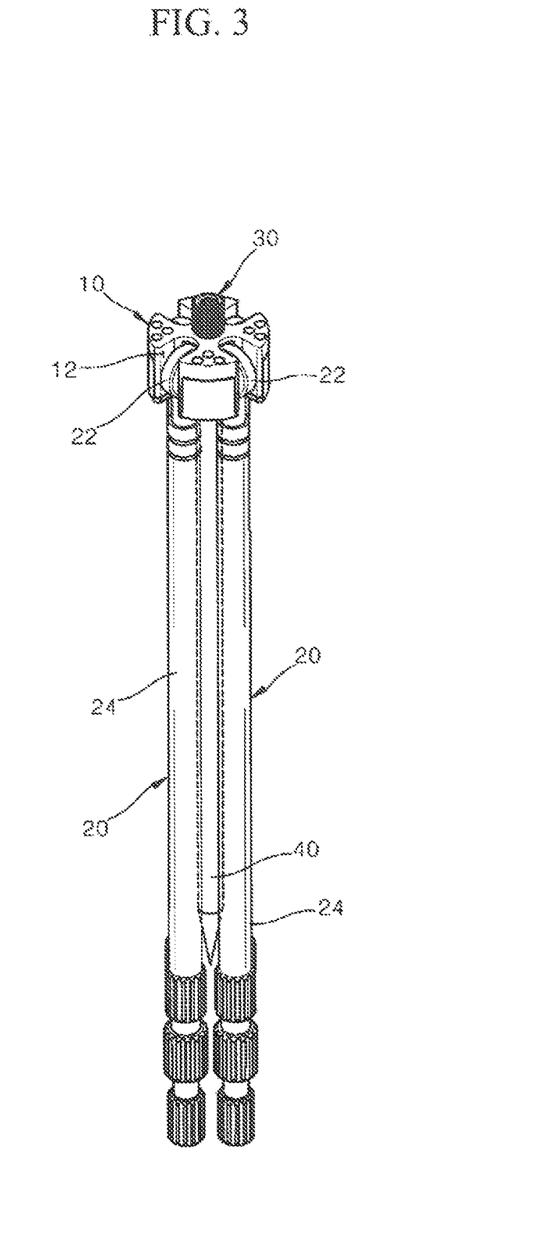
FIG. 3 is a second exemplary view illustrating operation of FIG. 1.
Figure 4:
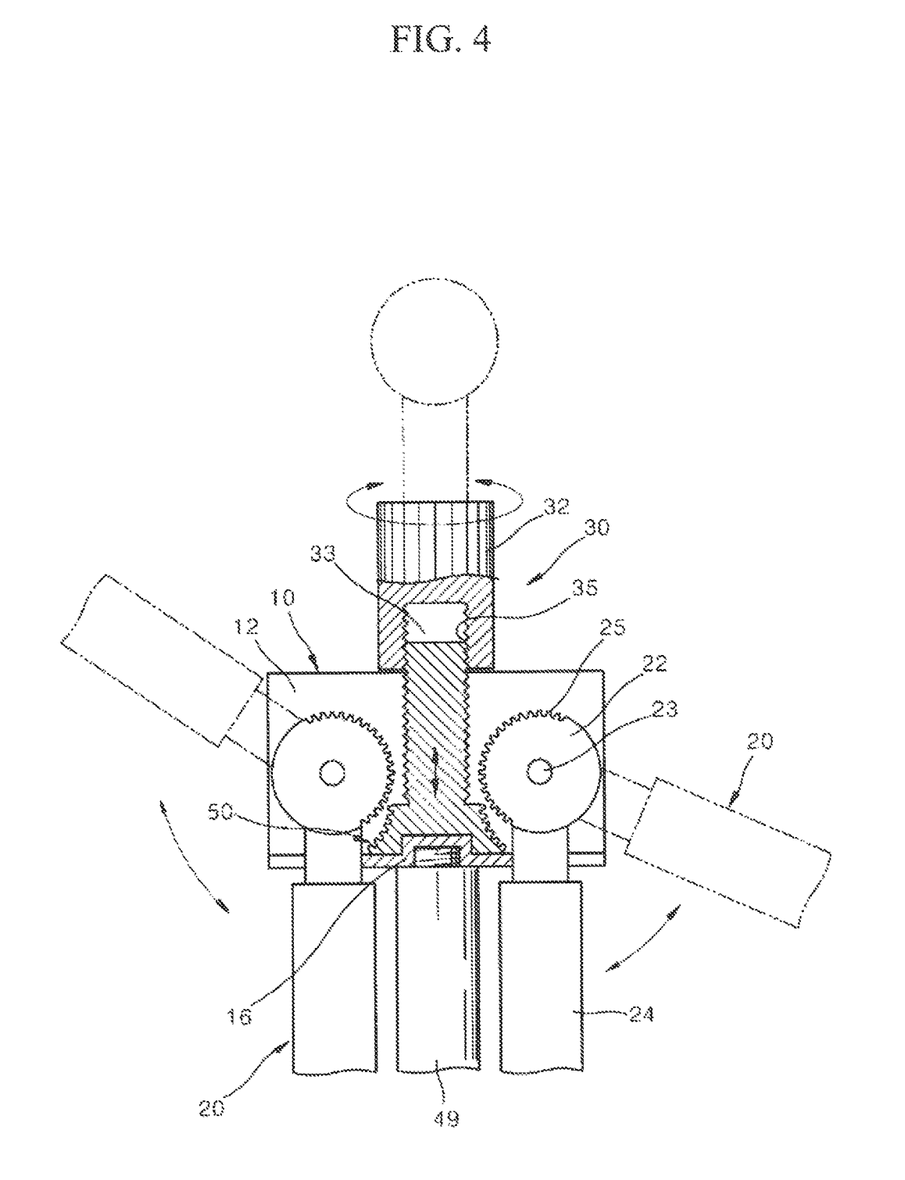
FIG. 4 is a cross-sectional view of a fixing module according to the first embodiment of the present invention.
Figure 5:
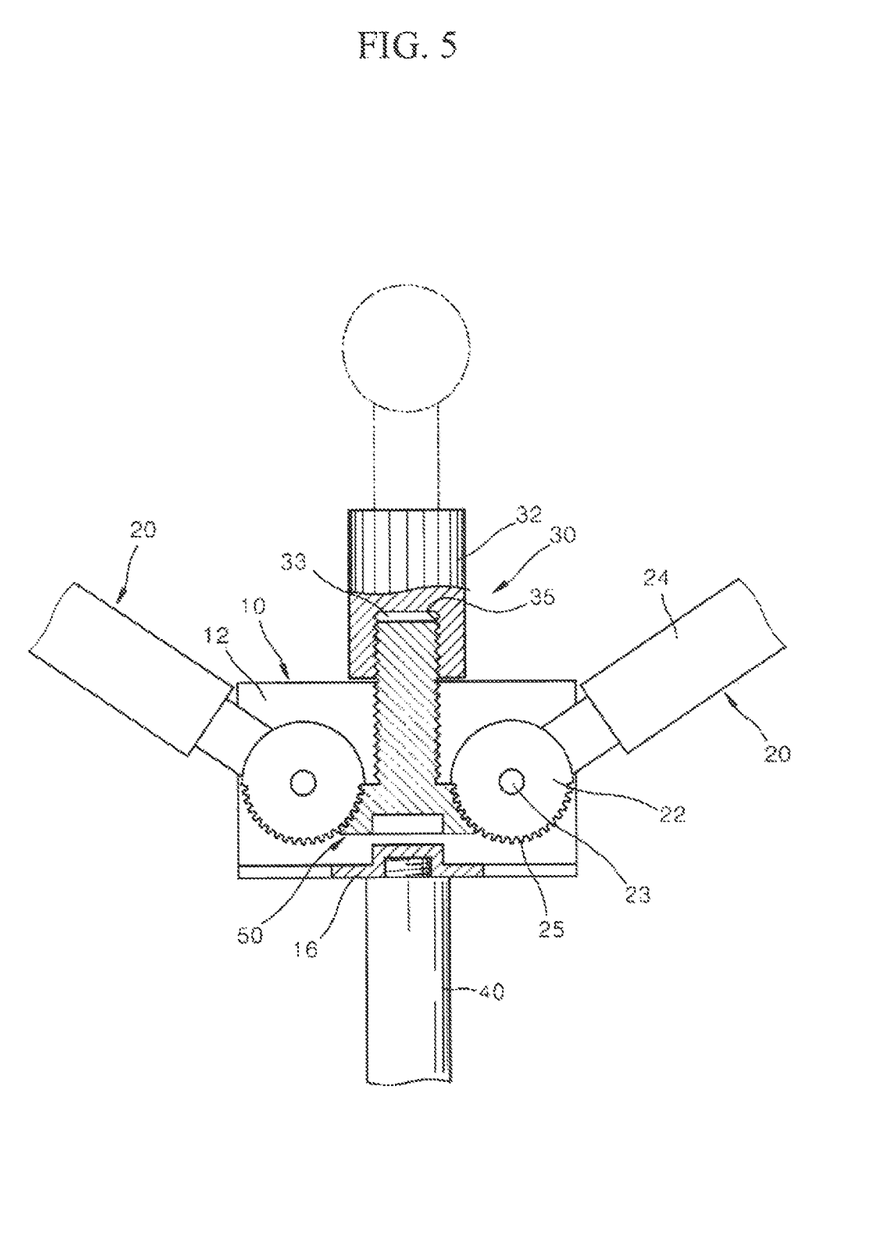
FIG. 5 is an exemplary view illustrating operation of FIG. 4.
Figure 6:
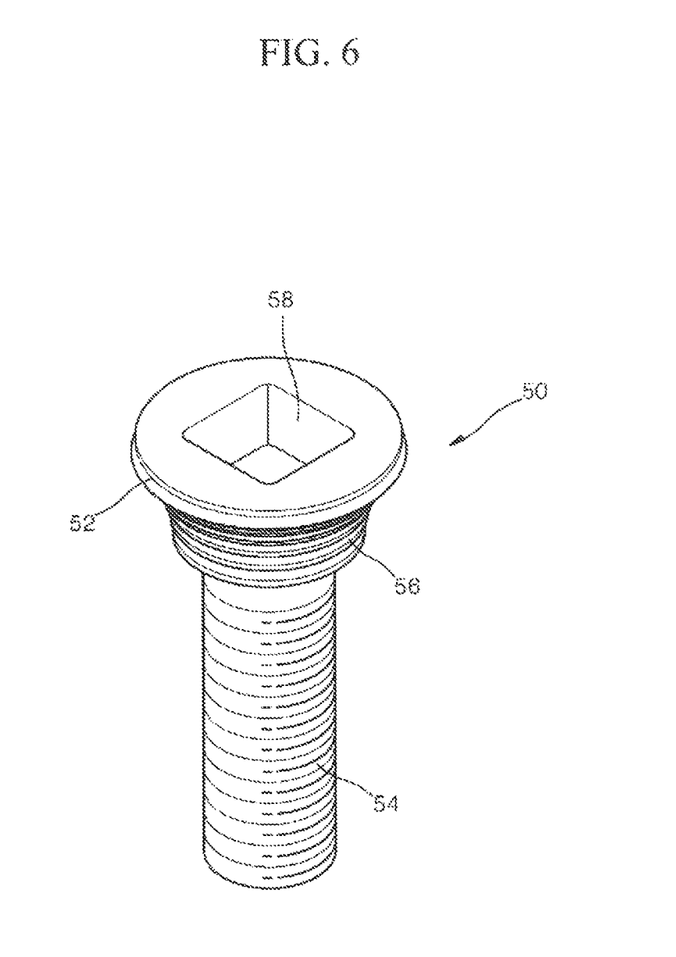
FIG. 6 is a perspective view of the fixing member illustrated in FIG. 4.

FIG. 1 is a perspective view of a first embodiment of the present invention, FIG. 2 is a first exemplary view illustrating operation of FIG. 1, FIG. 3 is a second exemplary view illustrating operation of FIG. 1, FIG. 4 is a cross-sectional view of a fixing module according to the first embodiment of the present invention, FIG. 5 is an exemplary view illustrating operation of FIG. 4, and FIG. 6 is a perspective view of the fixing member illustrated in FIG. 4.

As illustrated in the figurers, a support frame according to the present embodiment includes a housing 10 having a rotational groove 12, legs 20 having an upper end inserted in the rotational groove 12 of the housing to turn up and down and a lower end supported on the ground, a fixing module 30 disposed on the housing 10 to be moved by an operating force of a user and fixing the legs 20 in close contact with the upper ends of the legs 20, and a fixing pin 40 coupled to the housing to be fixed to the ground.

The housing 10 has a plurality of rotational grooves 12 for turning up and down the upper ends of the legs 20 and four rotational grooves 12 are arranged at 90 degrees in the present embodiment, but the number of the rotational grooves 12 may be changed in various ways, different from the present embodiment.

Further, the housing 10 further has a housing guide 16 for guiding the fixing member 50 up and down.

In the present embodiment, the housing guide 16 protrudes upward and has a thread on the inner side of the lower portion for coupling the fixing pin 40, so the coupling structure of the fixing pin 40 and the shape of the housing guide 16 are integrated at one portion.

In the present embodiment, the legs 20 can be turned up and down at 180 degrees in the rotational grooves 12.

The legs 20 have a rotary portion 22 inserted in the rotational groove 12 and hinge-coupled to the housing 10 and a leg portion 24 connected to the rotary portion 22.

A hinge pin 23 passes through the rotary portion 22, and the hinge pin 23 is hinge-coupled to the housing 10 through the rotary portion 22.

In the present embodiment, the rotary portion 22 is formed in a circular disc shape and has leg teeth 25 on the outer side for interference with the fixing module 30.

The leg portion 24 has joints to be stretched or contracted and this structure is well known to those skilled in the art, so it is not described herein.

The fixing module 30, which is provided to fix the plurality of legs 20 at the same time, includes an operation member 32 that is operated by an operating force of a user and a fixing member 50 that is moved up or down by interference with the operation of the operation member 32.

In the present embodiment, the operation member 32 is turned by an operating force of a user and the fixing member 50 is moved up and down by interference with the operation member 32.

To this end, the operation member 32 is exposed outside the housing 10 to receive force from a user and converts a rotational force from a user into a straight motion by interference with the fixing member 50.

To this end, an interference groove 33 where the fixing member 50 is inserted is formed in the operation member 32 and an interference portion 35 that generates interference with the fixing member 50 is formed on the inner side of the interference groove 33.

When the operation member 32 is turned, the fixing member 50 is moved up or down along the interference groove 33 in an engagement state.

The fixing member 50 has a fixing body 52 disposed in the housing 10, interference tooth portion 54 that is formed on the fixing body 52 and generates interference by being coupled to the interference portion 35, fixing tooth portion 56 that is formed on the outer side of the fixing body 52 and generates interference with the leg teeth 25 of the rotary portion 22, and a fixing guide 58 that is formed on the fixing body 52 and moves along the housing guide 16.

The fixing body 52 is formed such that the horizontal cross-section decreases as it goes up, and is formed in a conical shape in the present embodiment.

The interference tooth portion 54 is formed at the axial center of the fixing body 52 and the fixing tooth portion 56 is formed on the outer side of the fixing body.

The fixing guide 58 is formed on the bottom of the fixing body 52 and is coupled to the housing guide 16, thereby preventing the fixing member 50 from turning.

That is, by the coupling of the fixing guide 58 and the housing guide 16, the fixing member 50 is guided to move up and down and is prevented from turning, so a relative motion of the interfering portion 35 and the interference tooth portion 54 is converted into a straight motion.

Herein, the housing guide 16 has not a circular, but a polygonal horizontal shape and the fixing guide 58 is inserted in the housing guide 16 and moved only up and down without turning.

In the present embodiment, the housing guide 16 is inserted in the fixing guide 58, and in contrast to the present embodiment, the fixing guide may be inserted in the housing guide.

The interference tooth portion 54 is formed at the axial center of the fixing body 52, has threads formed around the outer side, and is engaged with the interference portion 35.

Accordingly, when a user turns the operation member 32, the interference portion 35 and the interference tooth portion 54 interfere with each other, so the fixing member 50 is moved up or down along the housing guide 16.

Herein, when the fixing member 50 is moved up, the fixing tooth portion 56 on the outer side of the fixing member 50 and the leg teeth 25 of the leg 20 are brought in close contact with each other, so the leg 20 is fixed.

In particular, since the plurality of leg teeth 25 are all fixed in close contact with the fixing tooth portion 56 when the fixing member 50 is moved up, the plurality of legs 20 are all fixed at a time.

Further, the legs 20 can be freely moved up and down with respect to the hinge pin 23, so the housing 10 can be horizontally maintained even on the ground such as a slope or a ground with many rocks or gravels using the plurality of legs 20.

Thereafter, when the fixing member 50 is moved up to be in close contact with the rotary portion 22, the rotary portion 22 can be prevented from turning by the engagement of the fixing tooth portion 56 and the leg tooth portion 25.

In the present embodiment, the legs 20 can be turned up and down at 180 degrees in the rotational grooves 12, and when there is no need for supporting on the ground, they may be lifted up from the ground.

On the other hand, the fixing pin 40 may be coupled to the lower portion of the housing 10 and the housing 10 may be further stably fixed by sticking the fixing pin 40 into the ground.

Whether to install the fixing pin 40 is not necessary, but depends on the situations, and the fixing pin 40 can be separated from the housing 10.

On the other hand, a level (not illustrated) may be disposed on the housing 10 for a user to check horizontality.

Further, when a beach umbrella is installed, a bracket (not illustrated) for installing the beach umbrella may be coupled to the operation member 32 or the housing 10 and structure for coupling the bracket is well known to those skilled in the art, so it is not described in detail herein.

When a camera is fixed, a bracket that is coupled to the camera body may be provided on the operation member 32 or the housing 10.

On the other hand, although the fixing member 50 and the rotary portion 22 interfere with each other by engagement in the present embodiment, the interference may be achieved by friction, unlike the present embodiment.

That is, instead of forming threads oil the outer side of the rotary portion 22, a material having large friction may be used and a material having large friction may be used for the fixing tooth portion of the fixing member 50. Accordingly, when the fixing member 50 is moved up, they are brought in close contact with each other and the plurality of legs 20 are simultaneously fixed by the friction.

Figure 7:
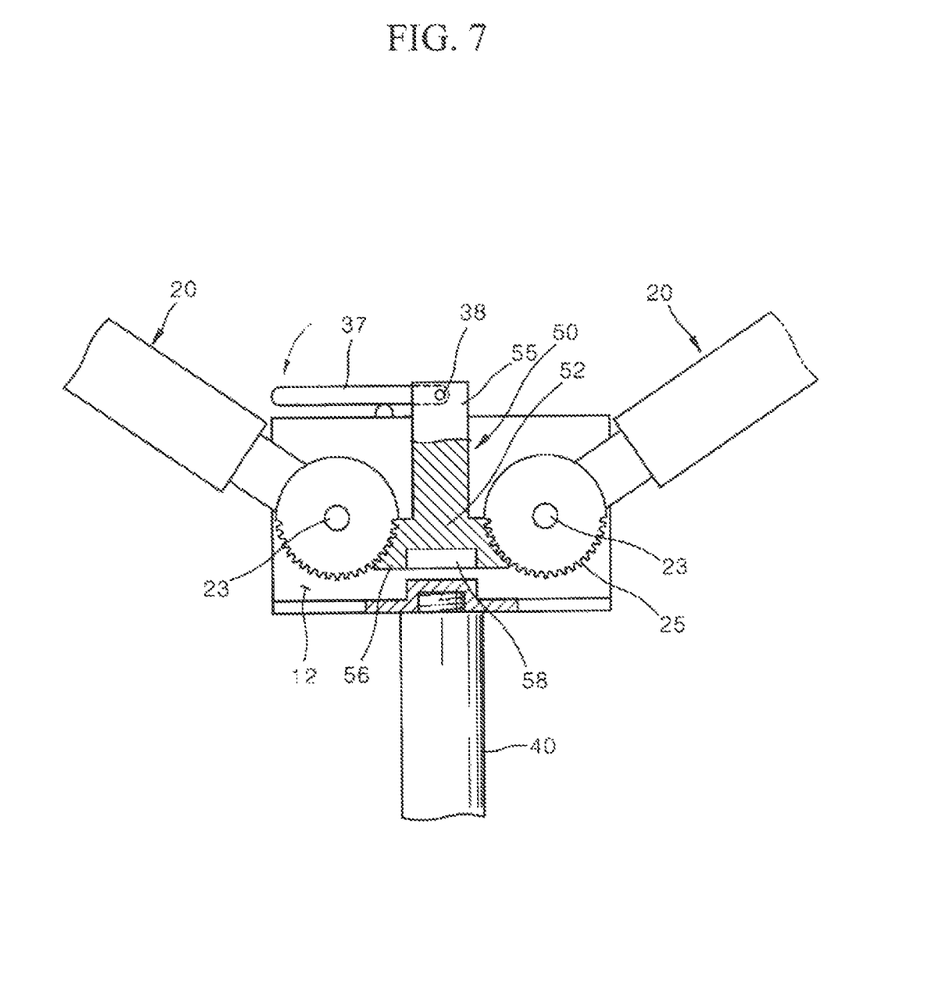
FIG. 7 is a cross-sectional view of a fixing module according to a second embodiment of the present invention.

FIG. 7 is a cross-sectional view of a fixing module according to a second embodiment of the present invention.

Although a user turns the operation member 32 and the rotational force is converted to move up or down the fixing member 50 in the first embodiment, the fixing member 50 may be configured to be move up or down directly by a force from a user.

That is, as illustrated in FIG. 7, a lever 37 may be disposed on the fixing member 50 such that the fixing member 50 is moved up with respect to the lever-shaped operation member 38 formed on the fixing member 50 when the lever 37 is turned.

Herein, the turned lever 37 can be fixed to the housing 10 by a specific fixing member.

The other configuration is the same as that of the first embodiment, so it is not described in detail.

Although exemplary embodiments of the present invention were described above with reference to the accompanying drawings, the present invention is not limited thereto and those skilled in the art would understand that the present invention may be implemented in various ways without changing the necessary features or the spirit of the prevent invention. Therefore, it should be understood that the exemplary embodiments are not limiting but illustrative in all aspects.

What is claimed is:

1. A support frame comprising:
a housing having a plurality of rotational grooves;
a plurality of legs having an upper end, wherein each of said upper end of the plurality of legs is inserted in the respective rotational groove of the plurality of rotational grooves to pivot about a respective horizontal axis, and a lower end configured to be supported on a ground; and
a fixing module disposed on the housing, wherein the fixing module is configured to be moved by an operating force applied by a user for fixing the legs simultaneously in close contact with the fixing module, wherein the fixing module includes:
an operation member disposed on the housing and configured to be turned by an operating force applied by a user; and
a fixing member disposed in the housing, interfering with the operation member, and simultaneously interfering with the plurality of legs, wherein the fixing member moves in a vertical direction by a rotation of the operation member, wherein the operation member has:
an interference groove wherein the fixing member is inserted in said interference groove of the operation member; and
an interference portion generating interference with the fixing member, on an inner side of the operation member, wherein the fixing member has:
a fixing body disposed in the housing;
an interference tooth portion that is formed on the fixing body and generates interference by being coupled to the interference portion;
a fixing tooth portion that is formed on an outer side of the fixing body and simultaneously generates interference with the plurality of legs; and
a fixing guide that is formed on the fixing body and moves along the housing.

2. The support frame of claim 1, wherein the plurality of legs has a rotary portion inserted in the rotational groove, hinge-coupled to the housing, and fixed by interference with the fixing module, and a leg portion connected to the rotary portion to be supported on the ground.

3. The support frame of claim 1, wherein the housing has a housing guide that prevents a rotation of the fixing member and guides the fixing member to move in the vertical direction.

4. The support frame of claim 1, further comprising a fixing pin fixed to the housing to be stuck into the ground.

5. The support frame of claim 1, wherein the operation member is formed in a lever shape, the operation member is connected to the fixing member through a lever shaft, and moves the fixing member up and down on the housing when being turned.

6. The support frame of claim 1, wherein the fixing member and the legs are configured to generate interference by friction or engagement with respect to one another.

* * * * *